United States Patent Office 3,809,618
Patented May 7, 1974

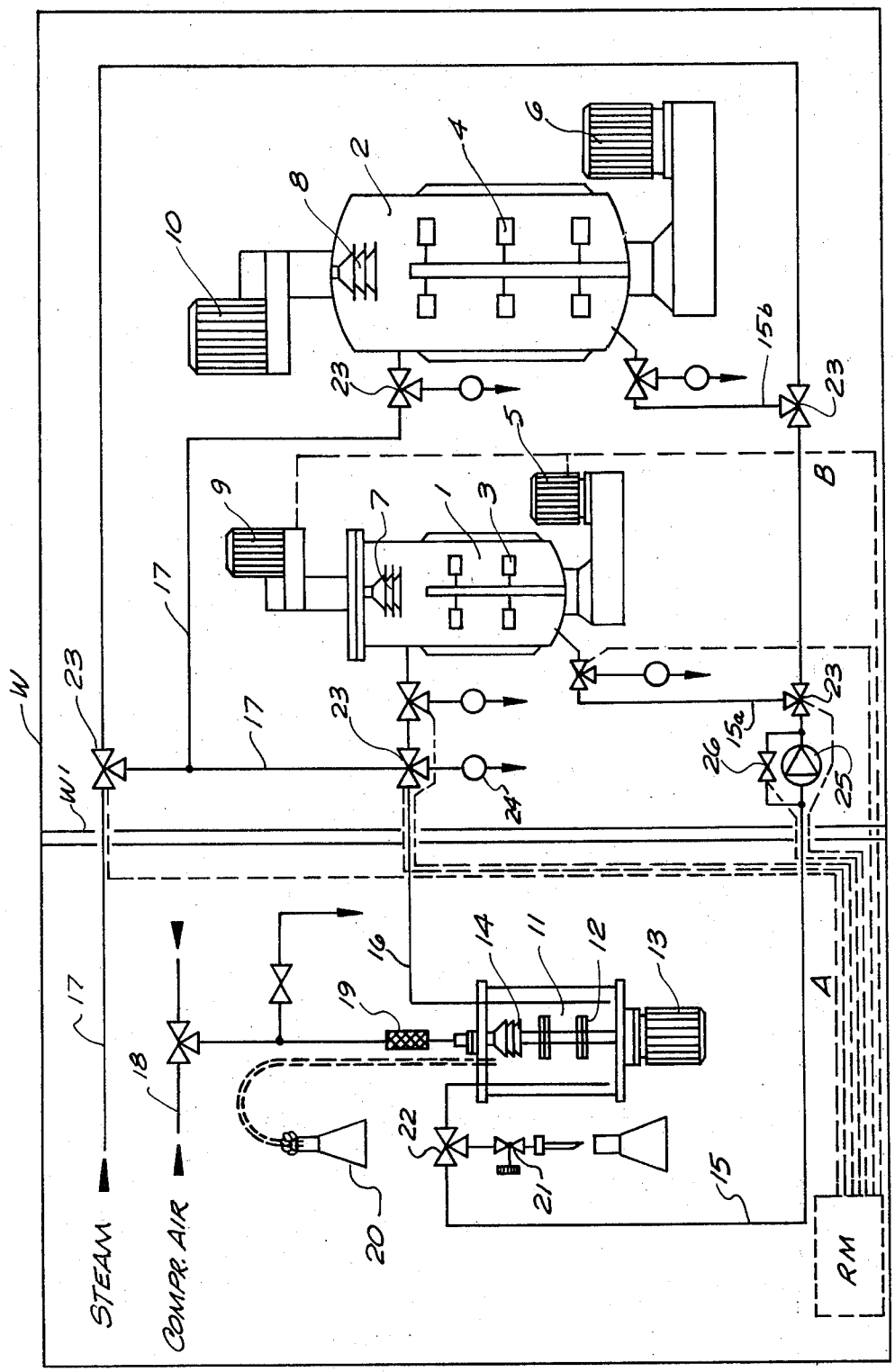

3,809,618
FERMENTATION INSTALLATION
Hans Müller, 415 Alte Landstrasse,
8908 Mannedorf, Switzerland
Filed June 7, 1972, Ser. No. 260,390
Claims priority, application Switzerland, June 8, 1971,
8,578/71
Int. Cl. C12b 1/00
U.S. Cl. 195—140            8 Claims

ABSTRACT OF THE DISCLOSURE

Two enclosed chambers are provided, in one of which a fermentation system is located, including a plurality of vessels. The regulating devices for regulating the operation of the fermentation system are located in the other chamber and operatively associated with the fermentation system. A control unit, including a receptacle, is also located in the other chamber and connected with the fermentation system in such a manner that its receptacle can be selectively connected with the respective vessels of the system.

BACKGROUND OF THE INVENTION

The present invention relates generally to a fermentation installation and more particularly to a fermentation installation in which the possibility is reliably precluded that exterior contaminants such as microorganisms might enter the actual fermentation system of the installation.

Fermentation installations are of course not new. Their operation and construction is well known and is not believed to require detailed discussions herein. Generally speaking it need only be pointed out that such installations usually have a fermentation system in which several fermentation vessels are provided which are controlled as to their operation from a control stand or the like. Of course, in fermentation systems it is necessary to supervise the progress of the fermentation which takes place, and to do so, it is known to withdraw samples from the various vessels of the system, for inspection and testing purposes, at withdrawal points provided on the vessels such as via petcocks or the like.

The difficulty with the prior art is that the system is installed in a chamber which, because it is necessary for the personnel to have access to the withdrawal points at the vessels, cannot be maintained in sterile condition. This means that when quantities of the vessel contents are withdrawn at the withdrawal points, there is the decided danger that contaminants such as microorganisms may enter into the vessel and may disadvantageously influence the fermentation process.

SUMMARY OF THE INVENTION

Accordingly, it is a general object of the present invention to overcome the disadvantages of the prior art.

More particularly, it is an object of the invention to provide an improved fermentation installation which is not possessed of these disadvantages.

Still more particularly, it is an object of the invention to provide such an improved fermentation installation in which all controls of the fermentation system, that is not only the controls affecting its operation but also any tests on samples of the contents of the vessels in the fermentation system, can be carried out in such a manner that the entry of contaminants into the vessels is reliably precluded.

In pursuance of these objects and of others which will become apparent hereafter, one feature of the invention resides in a fermentation installation, in a combination which briefly stated comprises wall means defining an enclosed chamber and a fermentation system located in this chamber and including a plurality of vessels. Regulating means regulates the operation of the fermentation system and is located outside the chamber and operatively associated with the fermentation system. A control unit, including a receptacle, is also located exteriorly of the chamber and connecting means is provided for selectively connecting the interior of the receptacle of the control unit with respective ones of the vessels in the chamber.

Thus, the regulating means and in particular the control unit, whose receptacle is adapted to receive test samples from the respective vessels of the fermentation system, can be located outside the chamber accommodating the fermentation system. This means that the condition in this chamber can be maintained completely sterile, permitting the chamber to be operated with the safeguards which are customary in bacteriological laboratories, and which assure that infections due to contamination of the contents of the vessels of the fermentation system caused by the entry of microorganisms or other contaminants, are reliably precluded.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single figure is a somewhat diagrammatic illustration showing an installation incorporating the present invention.

DESCRIPTION OF THE PREFERRED EMBODIMENTS

Discussing the drawing in detail, it will be seen that reference character W diagrammatically illustrates wall means which surrounds an enclosed space. The space is subdivided by additional wall means W' into a chamber A and a chamber B. Chamber B is the operating space in which a fermentation system is installed. Chamber A is a baceteriological laboratory in which all controls and regulating device for controlling and regulating the operation of the fermentation system of chamber B are located.

As diagrammatically shown, the fermentation system located in the chamber B comprises one vessel 1 which is the pre-fermenter and another vessel 2 which is the main fermenter. The operation and constsuction of such fermenters is well known and requires no detailed discussion. It is merely necessary to point out that the two vessels 1 and 2 are, in the manner conventional in this art, provided with rotary agitators 3 and 4, respectively, which are associated with electric drives 5 in the case of the agitator 3 and 6 in the case of the agitator 4, so that these agitators can be rotated and thereby agitate the contents of the vessels 1 and 2.

During he operation of the fermentation system in the chamber B, foam will develop in the vessels 1 and 2 due to the fermentation processes which take place in their contents. This foam is to be destroyed or separated from the contents and for this purpose the vessel 1 is provided with a foam separator 7 and the vessel 2 with a foam separator 8. The separator 7 is driven by a drive 9 and the separator 8 by a drive 10; the separators are rotated by their respective drives and are of substantially plateshaped or conical-disc-shaped configuration. When they are rotated they destroy foam by breaking up the entrapped air bubbles therein in a manner which is already known from the art and entirely conventional.

The operation of a fermentation system such as the one illustrated in the chamber B is usually such that in the vessel 1 an increase of the microorganisms in the nutrient substrate is effected, whereas the actual production of the product desired to be obtained is carried out in the main fermenter that is the vessel 2. When the requisite concentration of microorganisms is achieved in the contents of the vessel 1, these contents are transferred into the vessel 2 by connecting the two vessels with one another via the conduits 15, 15a, 15b.

The regulating devices for regulating the operation of the fermentation system of the chamber B by remote control are located in the chamber A. In addition, this chamber accommodates as a control unit 11, here configurated as a small laboratory-type fermenter having the illustrated receptacle, a rotary agitator unit 12, a drive 13, and a foam separator 14 which in this illustration is driven by the same drive 13 which also rotates the agitator 12.

The purpose of the control unit 11 includes the inspection and processing, if desired, of samples which are withdrawn from the vessels 1 or 2. For this purpose the unit 11 is connected with the conduit 15 which also connects the vessels 1 and 2. It should be pointed out in this connection that the unit 11 can of course also be used to introduce into the vessels 1 and 2 any components or the like which are required, for instance, microorganisms, rather than merely serving to withdraw samples from the vessels 1 and 2 for inspection and treatment.

In any case, the unit 11 can be selectively connected with the vessels 1 and 2. If the contents of the unit 11 are to be transferred into one of the vessels 1 or 2, the pump 25 can be utilized, which is provided with the by-pass valve 26. Alternatively, sterile compressed air can be utilized for effecting such transfer in which case compressed air is admitted via the conduit 18 into the unit 11 after being sterilized by the sterilizing filter 19.

Before the fermentation installation is placed into operation, it is sterilized by means of steam, which is admitted via the conduit 17 and which is distributed via the three-way valves 22, 23 to the various receptacles and vessels.

Reference numeral 24 identifies various condensate valves.

Unlike all known prior-art installations, the vessels 1 and 2 are not provided with valves for removal of samples. Rather, only the unit 11 is provided with a sample removal valve 21, and when a sample is to be taken from one of the vessels 1 or 2, this is possible only indirectly by connecting them with the unit 11 via the conduits 15 or 16 and the valves interposed in them. The control of the valves is of course affected via the regulating means which is not illustrated in detail but which has been shown diagrammatically. Such regulating means must be capable of operating the various valves of the installation, the various drives and all other devices which require such regulation. It is illustrated diagrammatically and identified with reference character RM.

When the fermentation installation according to the present invention is used, a culture which has been produced in the culture vessel 20 located in the chamber A is transferred into the unit 11, for instance by means of a conduit which is shown in broken lines. In the unit 11 an increase of the cultured bacteria can be carried out under constant control, which is simple because the chamber A can be constructed as a bacteriological laboratory and can of course accommodate all other equipment which is usually present in such a laboratory.

Only when the contents of the unit 11 are ready and when the vessels 1 and 2 have been sterilized with steam, are the contents of the unit 11 injected into the vessel 1, by connecting the unit 11 with the vessel 1 via the conduit 16 and the valves 23. Of course, the vessels 1 and 2 must be filled with nutrient substrate which can be admitted by non-illustrated conduits.

The point is that introduction of contents from the unit 11 into the vessels 1 or 2, and the withdrawal of samples from the vessels 1 and 2 into the unit 11, can be carried out without requiring access to the interior of the chamber B thereby preventing the possibility of contamination of the contents of the vessels 1 and 2. Of course, a baceriological laboratory such as can be accommodated in the chamber A can be operated with the usual precautions and in a condition of maximum sterility. The operation of the vessels 1 and 2 can be controlled automatically by the regulating means RM, if desired by a suitable program control, which does not, however, form a part of the present invention.

The operation and sterilization of the vessels 1 and 2 can be completely separated. For instance, while the vessel 2 operates on one batch of material, the vessel 1 can already have been sterilized, new nutrient substrate admitted to it, and new microorganisms admitted into it from the unit 11, so that a new batch of material can be readied in the vessel 1 for transfer into the vessel 2 as soon as the prior batch has been removed from the latter in completed condition.

While all this goes on the unit 11 can be used to withdraw samples from the vessels 1 and 2 selectively, for inspection of such samples and to determine the progress of operations in the respective vessels. It is merely necessary to sterilize the unit 11 and the various conduits with steam, an operation which is controlled from the chamber A via the various valves illustrated, before the unit 11 is connected with the respective vessels.

Evidently, if the fermentation installation is of large size and has more than one of the vessels 1 and more than one of the vessels 2, a unit 11 can be associated with each pair of vessels 1 and 2 so as to permit operations to proceed in the manner discussed before.

It will be understood that each of the elements described above, or two or more together, may also find a useful application in other types of constructions, differing from the types described above.

While the invention has been illustrated and described as embodied in a fermentation installation, it is not intended to be limited to the details shown, spice various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art, fairly constitute essential characteristics of the generic or specific aspects of this invention and therefore, such adaptations should and are intended to be comprehended within the meaning and range of equivalence of the following claims.

What is claimed as new and desired to be protected by Letters Patent is set forth in the appended claims.

I claim:

1. In a fermentation installation, in combination, wall means defining an enclosed chamber; a fermentation system located in said chamber and including a plurality of vessels; regulating means for regulating the operation of said fermentation system, said regulating means being located exteriorly of said chamber and being operatively associated with said fermentation system; a control unit effective for inspecting samples withdrawn from said vessels, said control unit also being located exteriorly of said chamber; and connecting means for selectively connecting said control unit with said vessels so as to permit withdrawal of said samples from said vessels and into said control unit without entry into said chamber, thereby preventing contamination of said vessels during removal of said samples therefrom.

2. In an installation as defined in claim 1, wherein said wall means further defines an additional chamber adjacent said enclosed chamber; and wherein said regulating means and control unit are located in said additional chamber.

3. In an installation as defined in claim 2, further comprising at least one additional fermentation system, additional regulating means for said additional fermentation system, and an additional control unit for said additional fermentation system; and wherein said additional regulating means and said additional control unit are located in said additional chamber.

4. In an installation as defined in claim 1, said control unit including a receptacle; and wherein said connecting means is effective for selectively connecting the interior of said receptacle with said vessels.

5. In an installation as defined in claim 4, wherein said control unit is a laboratory fermenter.

6. In an installation as defined in claim 5, wherein said laboratory fermenter comprises said receptacle, a rotary agitating unit in said receptacle for agitating the contents thereof, and rotating means for rotating said agitating unit.

7. In an installation as defined in claim 5, wherein said connecting means comprises first conduit means communicating with the interior of said receptacle, second and third conduit means communicating with the interior of the respective vessels, and valve means for selectively connecting said first conduit means with said second and third conduit means.

8. In an installation as defined in claim 1, wherein said control unit is effective for introducing components into said vessels via said connecting means, whereby contamination of said vessels during the introduction of said components into said vessels is prevented.

References Cited

New Brunswick Scientific Co. "Fermatron, The Universal Pilot Plant Fermentor," Bulletin No. FM 7155 (1970), pp. 1–8.

A. LOUIS MONACELL, Primary Examiner

R. B. PENLAND, Assistant Examiner